United States Patent

White et al.

[11] 3,977,894
[45] Aug. 31, 1976

[54] RHEOLOGICAL AGENT FOR NON-AQUEOUS FLUID SYSTEMS

[75] Inventors: Robert Winslow White, Califon; Armando Franco, Monmouth Junction, both of N.J.

[73] Assignee: NL Industries, Inc., New York, N.Y.

[22] Filed: Sept. 19, 1975

[21] Appl. No.: 615,105

[52] U.S. Cl. .......................... 106/288 Q; 106/308 N; 106/272; 106/72
[51] Int. Cl.² .......................................... C09C 1/42
[58] Field of Search ............ 106/308 N, 288 Q, 271, 106/272, 31, 32, 72

[56] References Cited
UNITED STATES PATENTS

| | | | |
|---|---|---|---|
| 3,123,488 | 3/1964 | Lindlaw | 106/271 |
| 3,819,386 | 6/1974 | Higgins et al. | 106/308 N |
| 3,864,294 | 2/1975 | Busch | 106/308 N |

*Primary Examiner*—Winston A. Douglas
*Assistant Examiner*—J. V. Howard

[57] ABSTRACT

A self-activating organoclay rheological additive for non-aqueous fluid systems has been produced comprising a homogeneous mixture of an organically modified montmorillonite clay and two solid waxes, the waxes being the activators for the organic clay. The two waxes are finely divided particles of glyceryl tri-12-hydroxystearate and an amide wax having the formula

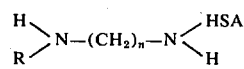

where $n$ is from 2 to 18, HSA is the acyl radical of 12-hydroxystearic acid, R is hydrogen or the acyl radical of 12-hydroxystearic acid.

The montmorillonite clay is modified with a quaternary ammonium compound.

7 Claims, No Drawings

RHEOLOGICAL AGENT FOR NON-AQUEOUS FLUID SYSTEMS

BACKGROUND OF THE INVENTION

In the prior art many different types of rheological agents are used in non-aqueous fluid systems such as paints, varnishes, enamels, waxes, epoxies, mastics and the like. These fluid systems often contain finely divided suspended materials, such as pigments and the like, and the rheological agent is added to thicken the system to produce a thixotropic flow behavior with high viscosity at a low shear rate.

Various organo modified clays and other inorganic and organic compounds have been used in the past to produce these rheological effects. Organoclays, however, require the use of polar solvent activators which must be added to the system to produce the rheological effect.

These polar additives, e.g. acetone, alcohols and the like are low flash point material and therefore should be avoided if possible. In addition, these polar additives must be added as a separate step at the time of preparing the systems. They are not added to the clay previously by the supplier and therefore this separate step adds to the cost of the system.

With regard to the use of prior art, organic rheological agents are also used, although they do not require polar solvent activation for the most part, however, they do require activation by heat. Many of these prior art organic additives when used result in seeding if the temperature is allowed to rise excessively.

In contrast to the prior art, a self-activating rheological agent has been produced by the instant invention which does not require the addition of polar solvent activators. In addition, the self-activating rheological agent of the instant invention contains the organoclay and the activating agent. This is supplied as a "one package" system which does not require the addition of separate ingredients by the user. This new type of organoclay system generally produces superior rheological properties to those produced by the prior art agents.

SUMMARY OF THE INVENTION

A self-activating rheological agent has been produced comprising a homogeneous mixture of finely divided particles of a montmorillonite clay modified with a quaternary ammonium compound, glyceryl tri-12-hydroxystearate and an amide wax having the formula

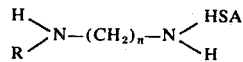

where $n$ is from 2 to 18, HSA is the acyl radical of 12-hydroxystearic acid, R is hydrogen or the acyl radical of 12-hydroxystearic acid; the ratio of the waxes being from about 4:1 to about 1:4, respectively. The waxes present in the mixture should be present in amount from about 5% to about 50%, preferably from about 10% to about 20%, the remainder being the organoclay, the percentages based on the weight of the rheological agent.

The wax blend itself is a rheological additive, however, it requires special handling procedures, mostly regarding the temperature. If high temperatures are reached during the manufacture and/or storage of the finished system (i.e. a paint formulation) "seeding" will be obtained.

Seeding is caused by the formation of wax agglomerates. At the low levels of the use of the wax combination, the seeding problem does not appear to be a factor under manufacture and/or high temperature storage.

The amount of the rheological agent used in the non-aqueous fluid system should be from about 0.5% to about 5.0% based on the weight of the treated non-aqueous fluid system.

DESCRIPTION OF THE PREFERRED EMBODIMENT

The organo modified montmorillonite clay is a bentonite or hectorite clay which has been treated with a quaternary ammonium compound which opens the clay structure to produce a more useful clay material. These organo modified clays are more fully described in U.S. Pat. No. 2,531,427 by Ernst A. Hauser and are manufactured and sold by N L Industries, Inc. under the trade name BENTONE.

In preparing the rheological agent of the instant invention, the clay particles modified with the quaternary ammonium compound are admixed thoroughly with the finely divided particles of the two waxes to form a blended powdery mixture.

This powdery mixture is employed in amounts from about 0.5% to about 5% in non-aqueous fluid systems to produce a thixotropic flow behavior which possesses high viscosity at low shear rates.

As stated above, the two waxes preferably employed are glyceryl tri-12-hydroxystearate and an amide wax having the formula

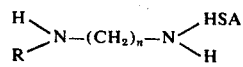

where $n$ is from 2 to 18, HSA is the acyl radical of 12-hydroxystearic acid, R is hydrogen or the acyl radical of 12-hydroxystearic acid.

The glyceryl tri-12-hydroxystearate wax acts as the thixotrope when properly dispersed and activated in the system. The amide wax is not an efficient rheological agent by itself, however, it acts as a dispersant when used in conjunction with the glyceryl tri-12-hydroxystearate.

Both of these waxes are ground to produce particles of size in which at least 95% pass through a 325 mesh.

The two waxes are employed in ratios of about 1:4 to about 4:1 and the amounts of the two waxes added are from about 5% to about 50%, preferably from about 10% to about 20%, based on the weight of the self-activated rheological agent.

The instant invention combined the use of organoclays and organo waxes in a manner which reduces the level of the organo compounds (which normally might produce seeding) and to obtain the benefits of both the organoclay and the organic compounds in terms of rheological effects (thixotropy) and superior stability to excessive high shear forces which normally result in thixotropic losses that are only partially recovered after aging when organic thixotropes are used.

A study of the use of the organoclay and the organic waxes of the instant invention revealed that the polar solvent activation (required by the prior art) was not required for the organoclay-organic wax mixtures of the instant invention when a product was prepared by blending the following compounds:
a. organoclay
b. organic thixotropic additive (i.e. the glyceryl tri-12-hydroxystearate)
c. the dispersant, i.e. the amide wax which in not an efficient thixotrope itself, but is an integral part of the product of the instant invention.

It is not clearly understood what mechanism is obtained, however, it may be possible that the organic amide wax triggers the activation of the organic wax thixotrope which in turn activates the organoclay.

Since the degree of dependency of polar activator for an organoclay may vary depending upon the amount of shear, the more shear applied, the least will be the requirement of polar activator. Therefore a simple system without the use of any solids in suspension was designed to reduce shear to a very minimum for a better evaluation of activation effect.

In order to illustrate this effect, 5 gallons of an alkyd solution was prepared by mixing the following ingredients;

| Ingredients | Wt. Percent |
| --- | --- |
| Oil Modified Alkyd Resin (70% Solids) | 50.28 |
| Tall Oil Fatty Acid Alkyd Resin (30% Solids) | 31.26 |
| Mineral Spirits | 18.46 |

In order to prepare the dispersions of the self-activating organoclay (containing the two waxes) the following procedure was used.

294 grams of the alkyd solution were added to a Waring Blender and under low agitation 6 grams (2%) of the organoclay containing the 2 waxes were added slowly to the alkyd solution. After all of the rheological agent is added, the mixture was blended at high speed for 10 minutes. The mixture formed a gel which was then stored overnight at 77°F. before the viscosity was measured.

The viscosity was then determined on a Brookfield viscosimeter (Model RVT) equipped with 7 spindles. The viscosity was determined at various speeds.

Using this method for determining the viscosity of various mixtures, the following examples were run in which the amounts of organoclay and the 2 waxes were varied in the alkyd solution.

EXAMPLE 1

To 294 grams of the above described alkyd solution were added 2% by weight of the following rheological agent:
86.5% bentonite clay modified with a quaternary ammonium compound
10.1% glyceryl tri-12-hydroxystearate and
3.4% 12-hydroxystearic acid diamide of ethylene diamine The rheological agent possessed a particle size of 95% minus 200 mesh.

The alkyd solution containing the rheological agent possessed a thixotropic flow behavior with high viscosity at a low shear rate. The viscosity of the solution in centipoises was determined at various R.P.M.'s using a Brookfield viscosimeter and the results obtained are recorded as follows:

| Viscosity C.P.S. | R.P.M. |
| --- | --- |
| 48000 | 0.5 |
| 26000 | 1 |
| 15200 | 2.5 |
| 6200 | 5 |
| 3700 | 10 |
| 2550 | 20 |
| 1500 | 50 |
| 980 | 100 |

In order to compare these results with various control runs, the following control runs were made.

Using the same alkyd solution and the same organoclay, the following mixtures were prepared:
Control A — Organoclay activated with 33% methanol/water mixture (based on the weight of the organoclay).
Control B — Organoclay with no activation.

The results of these control runs are recorded in Table I along with those of Example 1.

This example clearly shows that the self-activating rheological agent of the instant invention produces superior viscosities over the prior art which uses an externally added activator.

EXAMPLES 2–5

In these examples the procedure of Example 1 was repeated by adding 2% of the self-activating rheological agent to the alkyd solution except that a hectorite organoclay was employed. The ratio of the hectorite organoclay to the two waxes was 95% to 5% in Example 2, Example 3 was 90% to 10%, Example 4 was 75% to 25% and Example 5 was 50% to 50%. The results of these runs are recorded in Table II.

It should be noted that the viscosity increases as the amounts of waxes increase in the rheological agent.

EXAMPLES 6–10

In these examples only the two waxes were used without employing the organoclay. The two waxes were employed in the ratio of 3 to 1 and the amounts used were varied from 0.1% to 2.0%. The results are recorded in Table III. The data was so arranged that for each level of waxes in Table II, there is the same level of waxes alone in Table III.

These results show the rheological performance of using a blend of the two waxes without employing the organoclay. Note, however, at high level of addition, seeding occurs.

It sould be noted, however, that the use of the organoclay in conjunction with the two waxes produce much higher viscosities when compared with the use of the two waxes alone (at constant level of waxes).

By comparing the viscosities in Table II with the viscosities in Table III, it is evident that the use of the combination of the organoclay and the two waxes produce superior results and that the organoclay contributes to the viscosity, therefore it is activated by the presence of the two waxes.

EXAMPLES 11–13

In these examples different amide waxes were employed in place of the 12-hydroxystearic acid diamide of ethylene diamine. In Example 11, 12-hydroxystearic acid diamide of 1–6 hexane diamine was employed while in Examples 12 and 13, 12-hydroxystearic acid diamide of 1–3 propane diamine and 12-hydroxystearic acid monoamide of ethylene diamine, respectively, were used.

These results are recorded in Table IV.

When the following waxes were used in place of the 12-hydroxystearic acid diamine of ethylene diamine, the viscosity of the mixture dropped to an unsatisfactory level:

diglycol monoamide of 12-hydroxystearic acid
N-stearyl 12-hydroxystearamide
N(2-hydroxyethyl)-12-hydroxystearamide
12-hydroxystearic acid tetramide of tetraethylene pentamine
N-stearyl ricinoleamide
12-hydroxystearic acid diamide of aminoethyl ethanolamine
stearic acid diamide of aminoethyl ethanolamine
N-stearyl stearamide
stearic acid diamide of ethylene diamine

EXAMPLE 14

In this example the rheological agent was added at the 2% level and the agent contained the following ingredients:
- 90% Organoclay
- 7.5% Glyceryl tri-12-hydroxystearate
- 2.5% 12-hydroxystearic acid diamide of ethylene diamine The viscosity of the alkyd solution containing the above rheological agent was determined and the results are recorded in Table V. Three control runs were made which contained the following rheological agents:

| Control C | 90% Organoclay |
| --- | --- |
|  | 10% Glyceryl tri-12-hydroxystearate |
| Control D | 90% Organoclay |
|  | 10% 12-hydroxystearic acid diamide of ethylene diamine |
| Control E | 100% Organoclay |
|  | No activation |

The results of these control runs are also recorded in Table V.

It is evident that it is necessary to employ a combination of the organoclay and the two waxes in order to obtain superior activation results.

EXAMPLE 15

In this example the self-activating rheological agent described above was used to thicken an alkyd flat paint. 4 parts of the rheological agent were added to 1230 parts of the paint (approximately 100 gallons of paint). The rheological agent contained the following composition:
- 90 parts — hectorite clay modified with a quaternary ammonium compound
- 7.5 parts — glyceryl tri-12-hydroxystearate
- 2.5 parts — 12-hydroxystearic acid diamide of ethylene diamine The alkyd flat paint was prepared as follows:
- 225 lbs. — Oil modified alkyd resin, 35% solids
- 40 lbs. — Mineral spirits 4 lbs. — Of the above rheological agent After 5 minutes stirring the following pigments were added:
- 200 lbs. — Titanium dioxide pigment
- 200 lbs. — Calcium carbonate (2.5 microns)
- 350 lbs. — Calcium carbonate (10 microns)

The mixture was then further mixed to wet the pigment after which the speed was increased to obtain adequate dispersion conditions and until a Hegman Fineness of 5 was obtained.

The mixture was then let down by adding the following:
- 125 lbs. — Oil modified alkyd resin
- 86 lbs. — Mineral spirits
- 0.5 lbs. — (6%) Cobalt naphthenate
- 3 lbs. — (5%) Calcium naphthenate
- 2 lbs. — Methyl ethyl ketoxime The paint produced had a good appearance, a Hegman Fineness of 5 and a consistency of 89 Kreb Units.

Control paints were prepared in this same manner except that the rheological agent of the instant invention was not used. In Control A, the organo hectorite clay contained no activator while in Control B, the organo hectorite clay was activated with methanol and water (33%).

EXAMPLE 16

The same rheological agent used in Example 15 was added to an alkyd gloss enamel paint formulation which contains the following composition for 100 gallons of paint:
- 100 lbs. — Vinyl toluene-alkyd copolymer resin
- 39 lbs. — Mineral spirits
- 8 lbs. — Rheological agent described in Example 2
- 345 lbs. — Titanium dioxide pigment This mixture was then let down with the following:
- 393 lbs. — Of the above resin
- 199 lbs. — Mineral spirits
- 5.5 lbs. — (5%) Calcium octoate drier
- 2.3 lbs. — (6%) Cobalt octoate drier
- 0.9 lb. — Methyl ethyl ketoxime The properties of this paint along with 50/50 mixture of the organoclay and the two waxes in the rheological agent and a control which used methanol/water as the activator are recorded in Table II. It should be noted that the 50/50 mixture in the rheological agent produced seeds in the paint after a 2 week aging period at 120°F.

EXAMPLE 17

In this example an alkyd semigloss paint was prepared and contained the following ingredients in approximately 100 gallons of paint:
- 65 lbs. — Oil modified alkyd resin, 70% solids
- 65 lbs. — Mineral spirits
- 10 lbs. — Of rheological agent described in Example 2
- 250 lbs. — Titanium dioxide pigment
- 200 lbs. — Calcium carbonate (2.5 microns)

This mixture was then let down as follows:
- 445 lbs. — Oil modified isophthalic alkyd resin, 50% solids
- 60 lbs. — Mineral spirits
- 4 lbs. — (6%) Zirconium drier
- 2.5 lbs. — (6%) Cobalt naphthenate drier
- 1 lb. — Methyl ethyl ketoxime The paint properties of this paint were determined along with similar paints which contained different rheological agents. Control 17B contained a 50/50 mixture of clay and the two waxes, Control C contained methanol/water as the activator while Control D used an organic thixotrope instead of an organoclay-wax mixture.

The results are also recorded in Table II.

In all cases the paints which contained the self-activating rheological agent of the instant invention produces superior viscosities over all of the controls.

TABLE I

| Run No. | Rheological Agent Used | | Viscosity CPS R.P.M. | | | | | | | |
|---|---|---|---|---|---|---|---|---|---|---|
| | | | 0.5 | 1 | 2.5 | 5 | 10 | 20 | 50 | 100 |
| Example 1 | 86.5% | organoclay | | | | | | | | |
| | 10.1% | glyceryl trihydroxystearate | 48000 | 26000 | 15200 | 6200 | 3700 | 2550 | 1500 | 980 |
| | 3.4% | 12-hydroxystearic acid diamide of ethylene diamine | | | | | | | | |
| Control A | Organoclay activated with 35% methanol/water mixture | | 16000 | 9500 | 4600 | 2500 | 1700 | 1150 | 740 | 530 |
| Control B | 100% organoclay No activation | | Low Viscosity, Settled Rapidly | | | | | | | |

TABLE II

| Run No. | Rheological Agent Used | | % Organic Waxes | Viscosity CPS R.P.M. | | | | | | | |
|---|---|---|---|---|---|---|---|---|---|---|---|
| | | | | 0.5 | 1 | 2.5 | 5 | 10 | 20 | 50 | 100 |
| Example 2 | 95% | organoclay | | | | | | | | | |
| | 5% | { 3 pts. glyceryl trihydroxystearate 1 pt. amide wax | 0.1 | 20000 | 10500 | 5200 | 3200 | 2050 | 1350 | 865 | 610 |
| Example 3 | 90% | organoclay | | | | | | | | | |
| | 10% | { 3 pts. glyceryl trihydroxystearate 1 pt. amide wax | 0.2 | 41000 | 21000 | 9800 | 6100 | 3700 | 2550 | 1440 | 1100 |
| Example 4 | 75% | organoclay | | | | | | | | | |
| | 25% | { 3 pts. glyceryl trihydroxystearate 1 pt. amide wax | 0.5 | 102400 | 66000 | 29000 | 16800 | 10000 | 5400 | 3240 | 2320 |
| Example 5 | 50% | organoclay | | | | | | | | | |
| | 50% | { 3 pts. glyceryl trihydroxystearate 1 pt. amide wax | 1.0 | 240000 | 160000 | 64000 | 40000 | 24000 | 15000 | 8400 | 5600 |

TABLE III

| Run No. | Rheological Agent Used | | Viscosity CPS R.P.M. | | | | | | | |
|---|---|---|---|---|---|---|---|---|---|---|
| | | | 0.5 | 1 | 2.5 | 5 | 10 | 20 | 50 | 100 |
| Example 6 | 0.1% | { glyceryl trihydroxystearate amide wax | 6560 | 3600 | 2080 | 1360 | 1000 | 700 | 460 | 330 |
| Example 7 | 0.2% | { glyceryl trihydroxystearate amide wax | 18000 | 9600 | 5040 | 3080 | 2000 | 1400 | 860 | 560 |
| Example 8 | 0.5% | { glyceryl trihydroxystearate amide wax | 56000 | 32000 | 13600 | 8000 | 5300 | 3900 | 1440 | 1030 |
| Example 9 | 1.0% | { glyceryl rihydroxystearate amide wax | 118000 | 66000 | 35200 | 14800 | 8600 | 4600 | 2760 | 1920 |
| Example 10 | 2.0% | { glyceryl trihydroxystearate amide wax | SEEDED | | | | | | | |

TABLE IV

| Run No. | Rheological Agent Used | | Viscosity CPS R.P.M. | | | | | | | |
|---|---|---|---|---|---|---|---|---|---|---|
| | | | 0.5 | 1 | 2.5 | 5 | 10 | 20 | 50 | 100 |
| Example 11 | 90% | organoclay | | | | | | | | |
| | 7.5% | glyceryl trihydroxystearate stearate | 36400 | 22500 | 9600 | 5500 | 3500 | 2450 | 1620 | 1050 |
| | 2.5% | 12-hydroxystearic acid diamide of hexylene diamine | | | | | | | | |
| Example 12 | 90% | organoclay | | | | | | | | |
| | 7.5% | glyceryl trihydroxystearate | | | | | | | | |
| | 2.5% | 12-hydroxystearic acid diamide of propylene diamine | 22560 | 11600 | 5680 | 3520 | 2200 | 1490 | 1055 | 725 |
| Example 13 | 90% | organocaly | | | | | | | | |

TABLE IV-continued

| Run No. | Rheological Agent Used | | Viscosity CPS R.P.M. | | | | | | | |
|---|---|---|---|---|---|---|---|---|---|---|
| | | | 0.5 | 1 | 2.5 | 5 | 10 | 20 | 50 | 100 |
| | 7.5% | glyceryl trihydroxy-stearate | | | | | | | | |
| | 2.5% | 12-hydroxystearic acid monoamide of ethylene amine | 40000 | 22000 | 10000 | 6000 | 3700 | 2500 | 1510 | 1030 |

TABLE V

| Run No. | Rheological Agent Used | | Viscosity CPS R.P.M. | | | | | | | |
|---|---|---|---|---|---|---|---|---|---|---|
| | | | 0.5 | 1 | 2.5 | 5 | 10 | 20 | 50 | 100 |
| Example 14 | 90% | organoclay | | | | | | | | |
| | 7.5% | glyceryl trihydroxy-stearate | 41200 | 21000 | 9800 | 6100 | 3700 | 2550 | 1440 | 1100 |
| | 2.5% | 12-hydroxystearic acid amide of ethylene diamine | | | | | | | | |
| Control C | 90% | organoclay | | | | | | | | |
| | 10% | glyceryl trihydroxy-stearate | 1600 | 1300 | 890 | 670 | 530 | 430 | 300 | 275 |
| Control D | 90% | organoclay | | | | | | | | |
| | 10% | 12-hydroxystearic acid diamide of ethylene diamine | 1140 | 1020 | 770 | 600 | 505 | 430 | 230 | 225 |
| Control E | 100% | organoclay No activation | 1000 | 920 | 720 | 570 | 480 | 410 | 250 | 230 |

TABLE VI

| Example No. | Rheological Additive | Amount of Rheological Agent Used Lbs/100 Gal. | Hegman Fineness | Paint Appearance | Sag Test | Consistency Kreb Units | After 2 Wks. Aging 120°F. |
|---|---|---|---|---|---|---|---|
| 15 (Alkyd Flat) | 90 Organoclay 10 Two Waxes of the Instant Invention | 4 | 5 | Good | 3 | 89 | |
| Control No. | | | | | | | |
| 15A | Organoclay no Activator | 4 | 5 | Good | 3 | 79 | |
| 15B | Organoclay Methanol/Water as an Activator | 4 | 5 | Good | 3 | 87 | |
| 16 (Alkyd Gloss Enamel) | 90 Organoclay 10 Two Waxes of the Instant Invention | 8 | 6 | Good | 8 | 72 | Good |
| 16B | 50 Organoclay 50 Two Waxes of the Instant Invention | 8 | 6 | Good | 10 | 72 | Seeds |
| 16C | Organoclay Methanol/Water as an Activator | 8 | 6 | Good | 6 | 68 | Good |
| 17 (Alkyd Semi-gloss) | 90 Organoclay 10 Two Waxes of the Instant Invention | 10 | 6 | Good | 10 | 84 | |
| 17B | 50 Organoclay 50 Two Waxes of the Instant Invention | 10 | 6 | Good | 9 | 83 | |
| 17C | Organoclay Methanol/Water as an Activator | 10 | 6 | Good | 4 | 76 | |
| 17D | Organic Thixotrope | 10 | 6 | Good | 6 | 75 | |

We claim:

1. A self-activating organoclay rheological composition, useful as an additive for non-aqueous fluid systems, comprising a mixture of an organically modified montmorillonite clay and two solid waxes, said clay modified with a quaternary ammonium compound and said two waxes being (1) glyceryl tri-12-hydroxystearate and (2) an amide wax having the formula

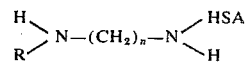

where $n$ is from 2 to 18, HSA is the acyl radical of 12-hydroxystearic acid, R is selected from the group consisting of hydrogen or the acyl radical of 12-hydroxystearic acid.

2. Composition according to claim 1 in which the two waxes are present in the composition in amount from about 5% to about 50%, preferably from about 10% to about 20%.

3. Composition according to claim 1 in which the ratio of the two waxes present in the mixture is from about 4:1 to about 1:4.

4. Composition according to claim 1 in which the amide wax is 12-hydroxystearic acid diamide of ethylene diamine.

5. Composition according to claim 1 in which the amide wax is 12-hyroxystearic acid diamide of hexylene diamine.

6. Composition according to claim 1 in which the amide wax is 12-hydroxystearic acid diamide of propylene diamine.

7. Composition according to claim 1 in which the amide wax is 12-hydroxystearic acid monoamide of ethylene amine.

* * * * *